United States Patent
Honda

(10) Patent No.: US 10,356,586 B2
(45) Date of Patent: Jul. 16, 2019

(54) PROJECTOR AND CONTROL METHOD

(71) Applicant: Seiko Epson Corporation, Tokyo (JP)

(72) Inventor: Masahiko Honda, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 421 days.

(21) Appl. No.: 15/017,348

(22) Filed: Feb. 5, 2016

(65) Prior Publication Data
US 2016/0234470 A1   Aug. 11, 2016

(30) Foreign Application Priority Data

Feb. 10, 2015   (JP) .................. 2015-024162

(51) Int. Cl.
| | |
|---|---|
| *G06F 3/042* | (2006.01) |
| *H04W 4/80* | (2018.01) |
| *H04B 5/00* | (2006.01) |
| *G06F 21/62* | (2013.01) |
| *H04N 9/31* | (2006.01) |
| *H04N 5/44* | (2011.01) |

(52) U.S. Cl.
CPC ............ *H04W 4/80* (2018.02); *G06F 3/0425* (2013.01); *G06F 21/62* (2013.01); *H04B 5/0031* (2013.01); *H04B 5/0056* (2013.01); *H04N 9/3194* (2013.01); *H04N 2005/4442* (2013.01)

(58) Field of Classification Search
CPC .............. H04N 9/3179; H04N 9/3173; H04N 2005/4442; H04N 9/3194; G06F 21/62; G06F 3/0425; H04W 4/80; H04B 5/3194; H04B 5/0031; H04B 5/0056
See application file for complete search history.

(56) References Cited

U.S. PATENT DOCUMENTS

| | | | |
|---|---|---|---|
| 2005/0128519 A1 | 6/2005 | Yamauchi | |
| 2007/0162181 A1 | 7/2007 | Ichieda | |
| 2009/0307491 A1* | 12/2009 | Nakatsugawa | ...... G06Q 20/341 713/169 |

(Continued)

FOREIGN PATENT DOCUMENTS

| | | |
|---|---|---|
| CN | 101001259 A1 | 7/2007 |
| JP | 2005-170000 A | 6/2005 |

(Continued)

OTHER PUBLICATIONS http://www.infosyncworld.com/news/n/10659.html: Dated Oct 9, 2010.*

*Primary Examiner* — Robert J Michaud
(74) *Attorney, Agent, or Firm* — ALG Intellectual Property, LLC

(57) ABSTRACT

A projector includes: a projection unit which projects a first image onto a projection surface; a detection unit which detects a position of an indicator on the projection surface; a first storage unit which stores a second image including a figure drawn according to the position of the indicator; an acquisition unit which acquires information for specifying a transmission destination of the second image via a wireless reader/writer; a communication unit which communicates via a network; and a transmission unit which transmits the second image via the communication unit to the transmission destination specified by the information acquired by the acquisition unit.

12 Claims, 6 Drawing Sheets

(56) References Cited

U.S. PATENT DOCUMENTS

| | | | |
|---|---|---|---|
| 2012/0220216 A1* | 8/2012 | Carbonell Duque | ........................ H04B 5/0031 455/26.1 |
| 2012/0297454 A1* | 11/2012 | Auger | ..................... G06F 21/54 726/4 |
| 2013/0298029 A1 | 11/2013 | Natori et al. | |
| 2013/0300658 A1 | 11/2013 | Endo et al. | |
| 2013/0335640 A1 | 12/2013 | Watanabe et al. | |
| 2014/0160076 A1* | 6/2014 | Ichieda | ................. G06F 3/0425 345/175 |
| 2015/0002435 A1* | 1/2015 | Shimizu | .............. G06F 3/04883 345/173 |
| 2015/0177861 A1* | 6/2015 | McCaughan | ....... G06F 3/03545 345/173 |
| 2015/0317074 A1 | 11/2015 | Natori et al. | |
| 2017/0199581 A1 | 7/2017 | Natori et al. | |

FOREIGN PATENT DOCUMENTS

| | | |
|---|---|---|
| JP | 2005-181606 A | 7/2005 |
| JP | 2008-83861 A | 4/2008 |
| JP | 2008-242970 A | 10/2008 |
| JP | 2010-140387 A | 6/2010 |
| JP | 2012-242503 A | 12/2012 |
| JP | 2013-235142 A | 11/2013 |
| JP | 2013-235416 A | 11/2013 |
| JP | 2014-002553 A | 1/2014 |

\* cited by examiner

PROJECTOR AND CONTROL METHOD

The entire disclosure of Japanese Patent Application No. 2015-024162, filed Feb. 10, 2015, is expressly incorporated by reference herein.

BACKGROUND

1. Technical Field

The present invention relates to a projector which transmits an image drawn according to the position of an indicator.

2. Related Art

In order to use various functions provided by a projector, the user may input various kinds of information to the projector. For example, JP-A-2008-083861 discloses that the user inputs a bookmark designation in order to perform bookmark registration on an image projected by an image projection device. JP-A-2012-242503 and JP-A-2005-181606 disclose that the user input authentication information to a projector in order to perform user authentication.

In the techniques disclosed in JP-A-2008-083861, JP-A-2012-242503 and JP-A-2005-181606, the user input various kinds of information to the projector by operating a computer or remote controller connected to the projector. This poses the problem that it takes time and effort to input information to the projector.

SUMMARY

An advantage of some aspects of the invention is to provide a technique for improving convenience for the user to input a transmission destination in a projector which transmits an image including a figure drawn according to the position of an indicator.

An aspect of the invention provides a projector including: a projection unit which projects a first image onto a projection surface; a detection unit which detects a position of an indicator on the projection surface; a first storage unit which stores a second image including a figure drawn according to the position of the indicator; an acquisition unit which acquires information for specifying a transmission destination of the second image via a wireless reader/writer; a communication unit which communicates via a network; and a transmission unit which transmits the second image via the communication unit to the transmission destination specified by the information acquired by the acquisition unit.

According to this projector, in a projector which transmits an image including a figure drawn according to the position of an indicator, the user can input a transmission destination more easily than in the case where information for specifying the transmission destination is not acquired via the wireless reader/writer.

In a preferred embodiment, the second image is an image made up of the figure drawn according to the position of the indicator combined with the first image.

According to this projector, a second image made up of a hand-drawn figure superimposed on a first image is transmitted. Therefore, an image made up of a projected image with information added can be easily available to the user.

In another preferred embodiment, the information acquired by the acquisition unit includes information for specifying an email address, and the transmission unit transmits the second image addressed to the email address.

According to this projector, an email address to be the transmission destination of the second image is specified by the information acquired via the wireless reader/writer.

In another preferred embodiment, the information acquired by the acquisition unit includes an identifier for identifying a user, and the transmission unit transmits the second image addressed to an email address specified via the identifier.

According to this projector, an email address to be the transmission destination of the second image is specified via the identifier acquired via the wireless reader/writer.

In another preferred embodiment, the information acquired by the acquisition unit includes encryption information for encrypting the second image, and the transmission unit transmits the second image encrypted using the encryption information.

According to this projector, the second image is prevented from being viewed surreptitiously by any third party who is not the user designating the transmission destination.

In another preferred embodiment, the projector further includes a second storage unit which stores the information acquired by the acquisition unit in a volatile storage area, and the transmission unit transmits the second image to a transmission destination specified by the information stored by the second storage unit.

According to this projector, leakage of the information is restrained, compared with the case where the information for specifying the transmission destination of the second image is stored in a non-volatile storage area.

In another preferred embodiment, the acquisition unit acquires a plurality of pieces of information read from a plurality of wireless tags via the wireless reader/writer, and the transmission unit transmits the second image to each transmission destination of a plurality of transmission destinations specified by the plurality of pieces of information acquired by the acquisition unit.

According to this projector, a plurality of users can input transmission destinations more easily than in the case where the plurality of information for specifying the plurality of transmission destinations is not read from the wireless tags.

In another preferred embodiment, the first storage unit stores a plurality of the second images, the information acquired by the acquisition unit includes designation information for designating at least one second image of the plurality of the second images, and the transmission unit transmits the second image designated by the designation information, of the plurality of the second images stored by the first storage unit.

According to this projector, from among the plurality of the second images drawn according to the position of the indicator, different second images are transmitted according to the information acquired via the wireless reader/writer.

In another preferred embodiment, the projector includes the wireless reader/writer.

According to this projector, the user can input a transmission destination via the projector.

In another preferred embodiment, the acquisition unit acquires the information via the wireless reader/writer provided in an external device which outputs a video signal to the projector.

According to this projector, the user can input a transmission destination via the external device even if the projector is installed in a place that the user cannot reach.

Another aspect of the invention provides a control method for a projector connected to a network including: projecting a first image onto a projection surface; detecting a position of an indicator on the projection surface; storing a second image including a figure drawn according to the position of the indicator; acquiring information for specifying a transmission destination of the second image via a wireless reader/writer; and transmitting the second image via the network to the transmission destination specified by the information.

According to this control method for the projector, in a projector which transmits an image including a figure drawn according to the position of an indicator, the user can input a transmission destination more easily than in the case where information for specifying the transmission destination is not acquired via the wireless reader/writer.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Configuration

Figure 1:
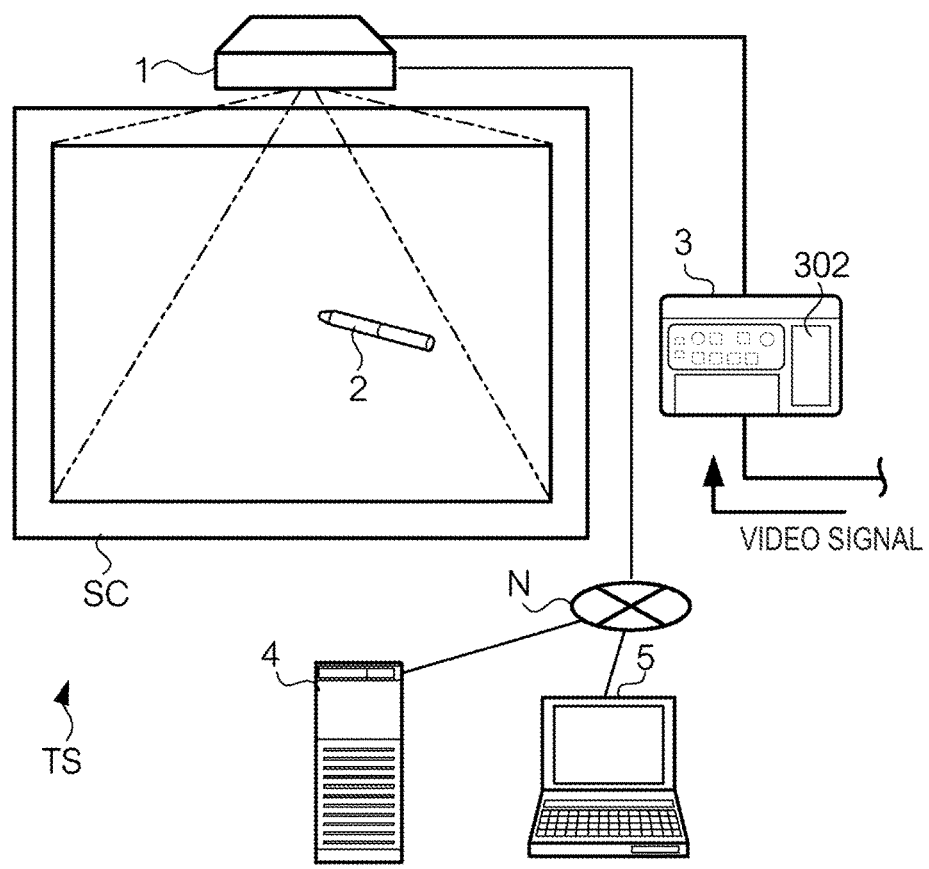
FIG. 1 shows the overall configuration of an image transmission system TS according to an embodiment.

FIG. 1 shows the overall configuration of an image transmission system TS according to an embodiment. The image transmission system TS includes a projector 1, a digital pen 2, an interface box 3 (hereinafter referred to as "IF box 3"), a server device 4, and a terminal device 5. The projector 1 is a device which projects an image (hereinafter referred to as "input image") shown by a video signal inputted from an electronic apparatus (not illustrated) as a video source, onto a screen SC (an example of a projection surface). The projector 1 is a projector with the so-called whiteboard function (also referred to as the electronic blackboard function or interactive function in some cases). In the example of FIG. 1, the projector 1 is a front projection-type short throw projector and is arranged above the screen SC. The digital pen 2 is an operation device used as an indicator on the screen SC. The projector 1 has the function of continuously specifying the position of the digital pen 2 on the screen SC. The projector 1 also has the function of storing an image (hereinafter referred to as "hand-drawn image") drawn according to the position (trajectory) of the digital pen 2, then attaching the hand-drawn image to an email and sending the email (hereinafter referred to as "email sending function"). The email sending function is executed, for example, when the user using the whiteboard function transmits the hand-drawn image to the terminal device which the user is using, in order to record the content drawn. In the image transmission system TS, the projector 1 transmits the hand-drawn image to the terminal device 5 via the server device 4. The digital pen 2 is used to input an instruction to the projector 1, on the screen SC.

The IF box 3 (an example of an external device) is a device which facilitates the connection between the projector 1 to an electronic apparatus to be a video source and the input of various instructions to the projector 1 (for example, turning the power on/off and switching between video sources or the like) when the projector 1 is arranged in a place that the user cannot easily reach (for example, on the ceiling of the room or at an upper part of the wall of the room). The IF box 3 is connected to the projector 1 and the electronic apparatus to be a video source and outputs video signals inputted from the electronic apparatus to be a video source, to the projector 1. An RFID (radio frequency identifier) reader/writer 302 conforming to a predetermined international standard (for example, ISO/IEC 14443 Type A/Type B, ISO/IEC 18092, ISO/IEC 15693 or the like) is incorporated in the IF box 3. The use of the RFID reader/writer 302 will be described later.

The server device 4 is an information processing device which manages the sending and receiving of emails when the mail sending function is executed in the projector 1, that is, a mail server. The terminal device 5 is a device which receives a hand-drawn image transmitted from the projector 1, for example, a personal computer. The projector 1, the server device 4 and the terminal device 5 are connected to a network N such as the internet and communicate via the network N.

Figure 2:
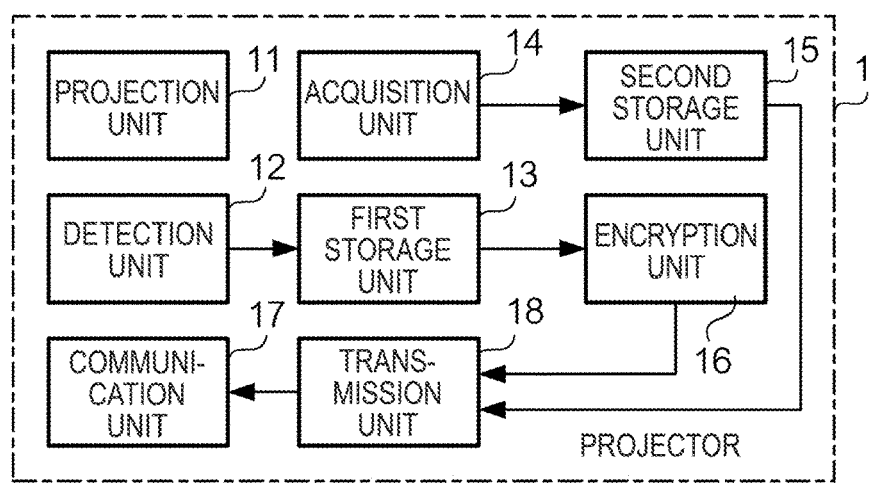
FIG. 2 is a block diagram showing the functional configuration of a projector.

FIG. 2 is a block diagram showing the functional configuration of the projector 1 according to an embodiment. The projector 1 includes a projection unit 11, a detection unit 12, a first storage unit 13, an acquisition unit 14, a second storage unit 15, an encryption unit 16, a communication unit 17, and a transmission unit 18. The projection unit 11 projects an input image (an example of a first image) onto the screen SC. The detection unit 12 detects the position of the digital pen 2 on the screen SC. The first storage unit 13 stores a hand-drawn image (an example of a second image). The acquisition unit 14 acquires information for specifying the transmission destination of the hand-drawn image (hereinafter referred to as "transmission destination information") via the RFID reader/writer 302 (an example of a wireless reader/writer). The second storage unit 15 stores the information acquired by the acquisition unit 14 in a volatile storage area. The encryption unit 16 encrypts the hand-drawn image stored in the first storage unit 13. The communication unit 17 communicates via the network N. The transmission unit 18 transmits the hand-drawn image encrypted by the encryption unit 16, via the communication unit 17. The transmission unit 18 transmits the hand-drawn image to the transmission destination specified by the transmission destination information acquired by the acquisition unit 14.

Figure 3:
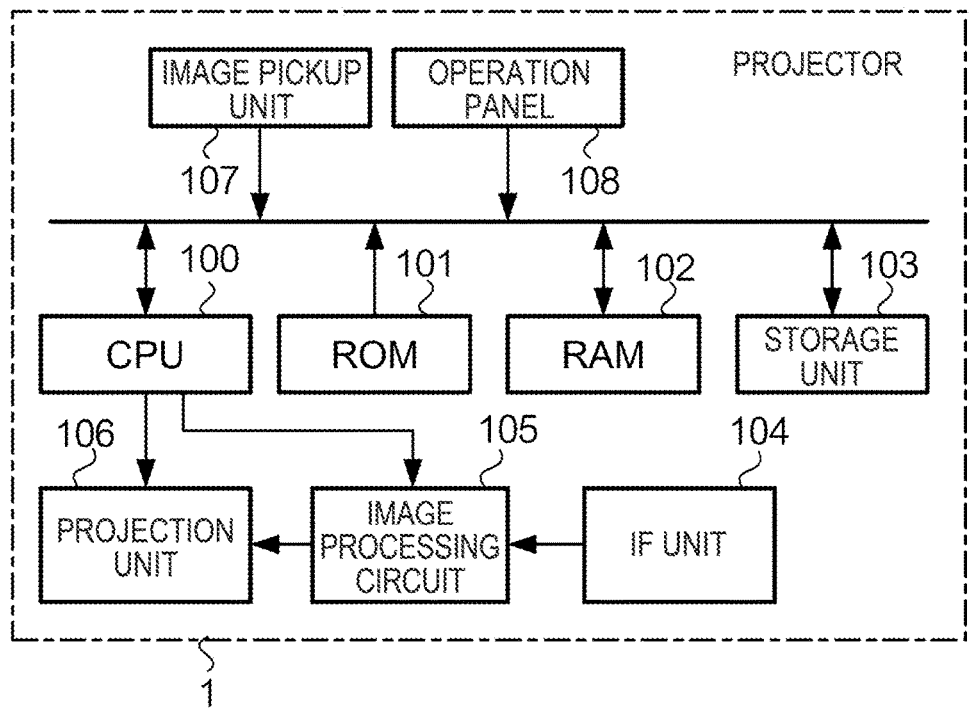
FIG. 3 shows an example of the hardware configuration of the projector.

FIG. 3 shows an example of the hardware configuration of the projector 1 according to an embodiment. The projector 1 includes a CPU (central processing unit) 100, a ROM (read only memory) 101, a RAM (random access memory) 102, a storage unit 103, an IF (interface) unit 104, an image processing circuit 105, a projection unit 106, an image pickup unit 107, and an operation panel 108.

The CPU 100 is a control device which controls each part of the projector 1. The ROM 101 is a non-volatile storage device in which various programs and data are stored. The RAM 102 is a volatile storage device which stores data, and functions as a work area for the CPU 100 to execute processing. The storage unit 103 is a non-volatile storage device which stores data and programs, for example, an SSD (solid state drive). In this example the storage unit 103 stores a program for the projector 1 to implement the whiteboard function (hereinafter referred to as "whiteboard program") and a program for the projector 1 to implement the email sending function (hereinafter referred to as "email sending program"). The email sending program may be stored in the ROM 101.

The IF unit 104 is an interface which mediates the transmission and reception of signals or data to and from the electronic apparatus to be a video source and which communicates with the server device 4 via the network N. The IF unit 104 also has various terminals for transmitting and receiving signals or data to and from an external device (for example, VGA terminal, USB terminal, wired LAN interface, S terminal, RCA terminal, HDMI (high-definition multimedia interface: trademark registered) terminal and the like), and a wireless LAN interface.

The image processing circuit 105 performs predetermined image processing on a video signal inputted thereto. The projection unit 106 projects an image onto the screen SC according to the image-processed video signal. The projection unit 106 has a light source, a light modulator, an optical system, and drive circuits for these components (none of them being illustrated). The light source has a lamp such as a high-pressure mercury lamp, halogen lamp or metal halide lamp, or a solid light source such as LED (light emitting diode) or laser diode. The light modulator is a device which modulates light emitted from the light source according to a video signal, and has a liquid crystal panel, for example. The optical system is an element which projects the light modulated by the light modulator onto the screen SC, and has a lens and a prism, for example. In this example, the light source and the light modulator are provided for each color component. Specifically, light modulators corresponding individually to the three primary colors of red, green and blue, respectively, are provided. The light modulated by each liquid crystal panel is combined by the optical system and projected onto the screen SC.

The image pickup unit 107 picks up an image of an area including the screen SC where the image is projected, in order to specify the position of the digital pen 2. In this example, the digital pen 2 has a light emitting element which outputs light with a unique wavelength, and a pressure sensor at the tip of the pen. As the pressure sensor detects pressure, the light emitting element outputs light. The CPU 100 detects the position of the digital pen 2 on the basis of the position of a point equivalent to the light with the wavelength in the image picked up by the image pickup unit 107. The image pickup unit 107 picks up an image of an area including the screen SC, on a predetermined cycle. If the detected positions are arranged in time series, the trajectory of the digital pen is obtained. The CPU 100 controls the image processing circuit 105 and the projection unit 106 so as to draw an image corresponding to the detected positions of the digital pen 2.

The operation panel 108 is an input device for the user to input instructions to the projector 1, and includes a key pad, button, or touch panel, for example.

In this example, the projection unit 106 is an example of the projection unit 11. The image pickup unit 107 controlled by the CPU 100 executing the whiteboard program is an example of the detection unit 12. The storage unit 103 controlled by the CPU 100 executing the whiteboard program is an example of the first storage unit 13. The IF unit 104 controlled by the CPU 100 executing the email sending program is an example of the acquisition unit 14, the communication unit 17 and the transmission unit 18. The RAM 102 controlled by the CPU 100 executing the email sending program is an example of the second storage unit 15. The CPU 100 executing the email sending program is an example of the encryption unit 16.

Figure 4:
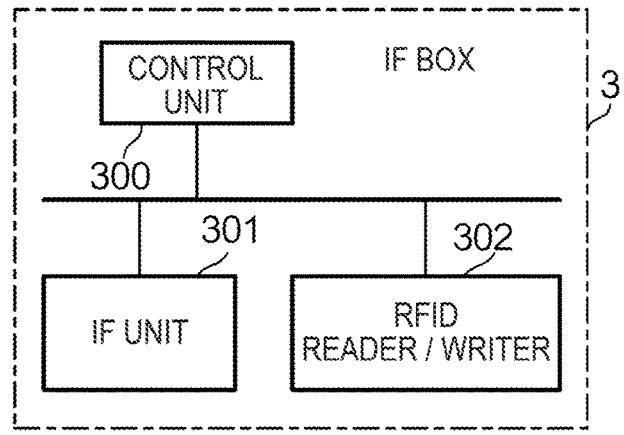
FIG. 4 shows an example of the hardware configuration of an IF box.

FIG. 4 shows an example of the hardware configuration of the IF box 3. The IF box 3 has a control unit 300, an IF unit 301, and the RFID reader/writer 302. The control unit 300 is a control device which controls each part of the IF box 3. The IF unit 301 is an interface which mediates the transmission and reception of signals or data to and from the electronic apparatus to be a video source and the projector 1. The IF unit 301 has various terminals for transmitting and receiving signals or data to and from an external device. In this embodiment, one input terminal of the IF box 3 is connected to the electronic apparatus to be a video source, and one output terminal corresponding to the one input terminal is connected to an input terminal of the projector 1. The RFID reader/writer 302 performs short-range wireless communication via an RFID (radio frequency identification) tag and NFC (near field communication) conforming to a predetermined international standard (for example, ISO/IEC 14443 Type A/Type B, ISO/IEC 18092, ISO/IEC 15693 or the like).

Figure 5:
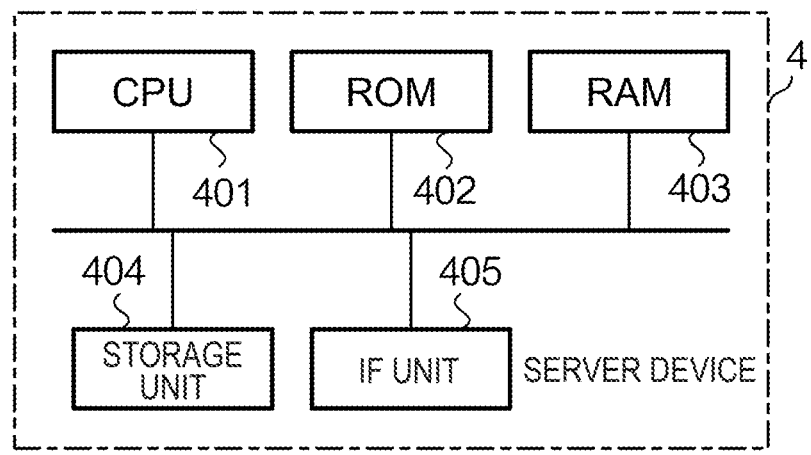
FIG. 5 is a block diagram showing the hardware configuration of a server device.

FIG. 5 shows an example of the hardware configuration of the server device 4. The server device 4 is a computer having a CPU 401, a ROM 402, a RAM 403, a storage unit 404, and an IF unit 405. The CPU 401 is a control device which executes programs and thus controls each part of the server device 4. The CPU 401 reads out programs stored in the ROM 402 and the storage unit 404 and executes the programs, using the RAM 403 as a work area. The ROM 402 is a non-volatile storage device in which various programs and data are stored. The RAM 403 is a volatile main storage device which stores data.

The storage unit 404 is a non-volatile auxiliary storage device which stores various programs and data. The IF unit 405 is a unit for transmitting and receiving data and communicates with the projector 1 and the terminal device 5 via the network N.

Figure 6:
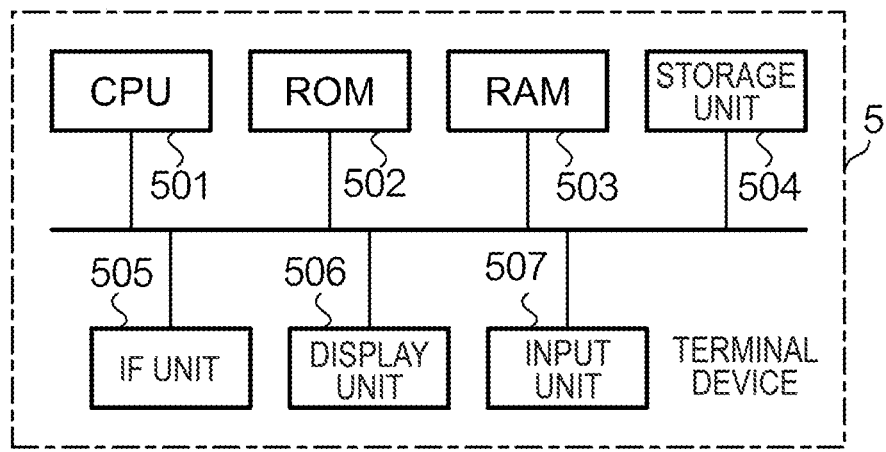
FIG. 6 is a block diagram showing the hardware configuration of a terminal device.

FIG. 6 is a block diagram showing the hardware configuration of the terminal device 5. The terminal device 5 is a computer having a CPU 501, a ROM 502, a RAM 503, a storage unit 504, an IF unit 505, a display unit 506, and an input unit 507. The CPU 501 is a control device which executes programs and thus controls each part of the terminal device 5. The CPU 501 reads out programs stored in the ROM 502 or the storage unit 504 and executes the programs, using the RAM 503 as a work area. The ROM 502 is a non-volatile storage device in which various programs and data are stored. The RAM 503 is a volatile main storage device which stores data.

The storage unit 504 is a non-volatile auxiliary storage device which stores various programs and data. The IF unit 505 is a unit for transmitting and receiving data and communicates with the server device 4 via the network N.

The display unit 506 is a unit for displaying information, for example, a liquid crystal display. The input unit 507 is a device for accepting inputs by the user and includes a keyboard, a mouse, and various buttons or the like.

2. Problems of Related-Art Technique

Before explaining the operations in this embodiment, problems of the related-art technique will be described.

Figure 7:
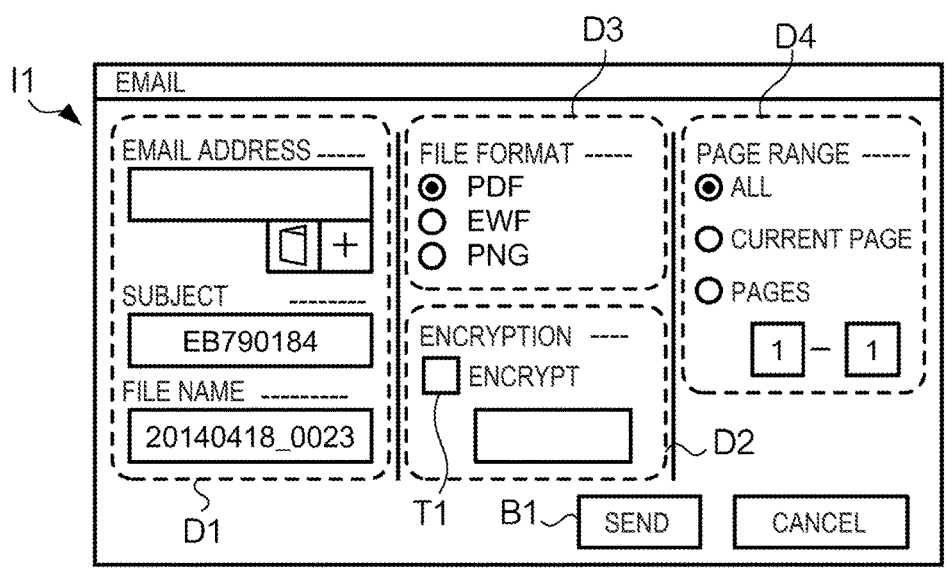
FIG. 7 shows an example of a setting screen at the time of executing an email sending function.

FIG. 7 shows an example of a setting screen I1 projected on the screen SC at the time of executing the email sending function. In this example, the user carries out various settings for sending an email, by operating the setting screen I1 with the use of the digital pen 2. Specifically, the user inputs an email address to be transmission destination of the email, the subject of the email, and the file name of a hand-drawn image attached to the email, by operating an area D1 on the setting screen I1. In the case of encrypting the attached hand-drawn image, the user enters a check mark in a checkbox T1 in an area D2 on the setting screen I1 and enters a password for encryption. When the input spaces for email address, subject, file name and encryption are selected, a virtual keyboard is displayed on the screen SC, in addition to the setting screen I1. The user inputs the email address and the like by touching keys of the virtual keyboard with the digital pen 2. These inputs may be made using a remote controller of the projector 1. In each of the subject and file name spaces, a letter string generated according to preset rules is displayed as an initial setting. The user also designates the file format of the hand-drawn image and the page range of the hand-drawn image to be transmitted, by operating area D3 and an area D4 on the setting screen I1. When these operations are finished, the user presses a send button B1. As the send button B1 is pressed, the email is sent with the details set on the setting screen I1.

In the above method, when using the email sending function, the user must input the email address letter by letter, using the digital pen 2. This poses the problem that it takes time and effort to input the email address. For example, in the case where the email sending function is used in a meeting or in a lesson at school, if the input of an email address takes time and effort, it may interrupt the progress of the meeting or lesson. In order to avoid the time and effort for inputting an email address, a method of registering the email address in the projector 1 in advance may be employed. However, depending on the format of the email to be sent, the user ID and password may need to be inputted in addition to the email address. Registering such personal information in the projector 1 in advance is not preferable in view of security. Also, with the method of registering the email address in the projector in advance, there is a possibility that the user may select a wrong email address from registered email addresses and thus the email may be sent to the wrong email address, allowing the content of the hand-drawn image to be leaked. On the other hand, if the hand-drawn image is encrypted in order to prevent the leakage of the content of the hand-drawn image due to the email address selection error, the input of the password for encryption takes time and effort and is not preferable in view of security as well. In this embodiment, these problems are dealt with.

3. Operations

Figure 8:
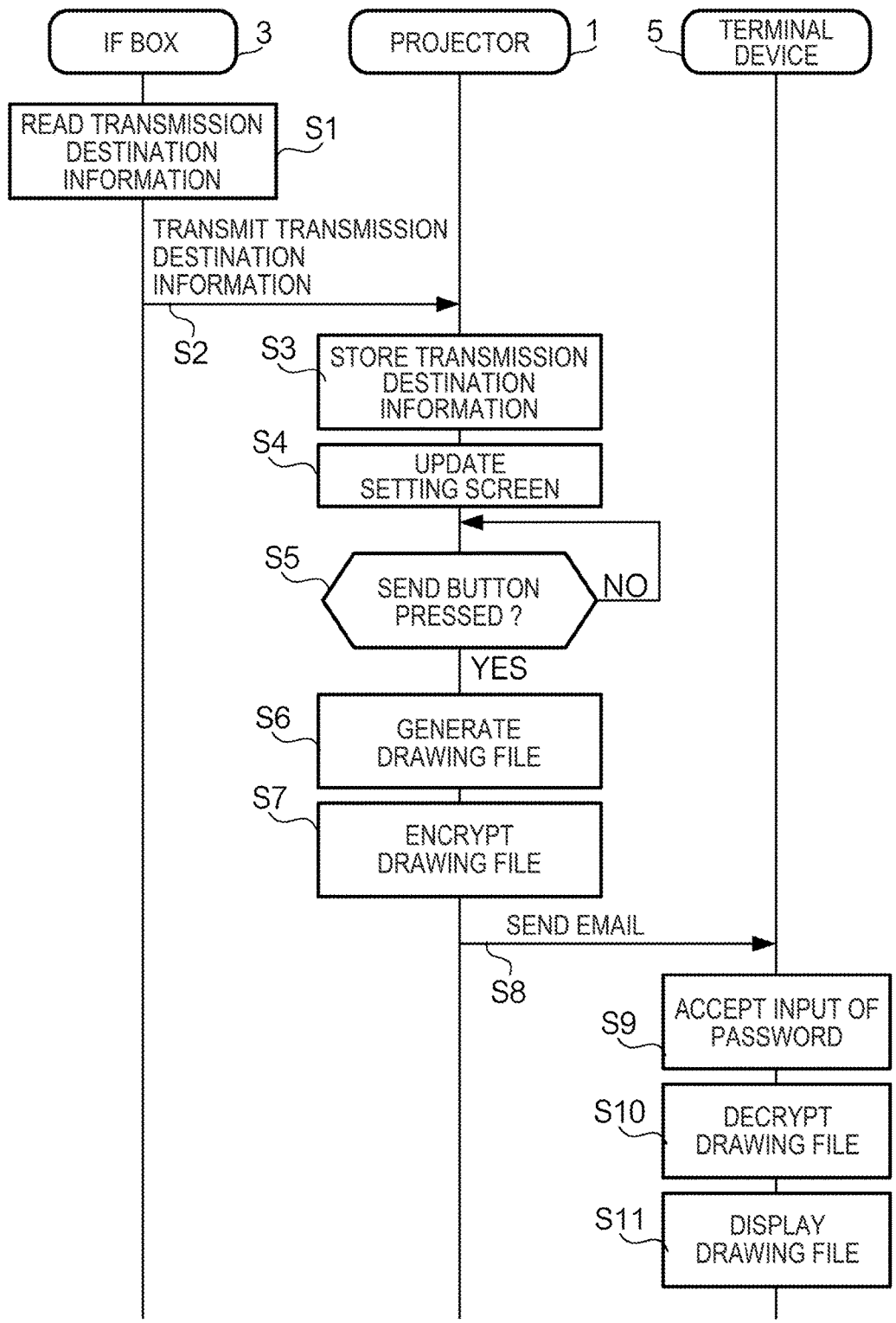
FIG. 8 is a sequence chart showing operations in the image transmission system TS.

FIG. 8 is a sequence chart showing the operations in the image transmission system TS. The processing shown in FIG. 8 is started, for example, in the state where a hand-drawn image is stored in the storage unit 103 and where the setting screen I1 is projected on the screen SC. The setting screen I1 is projected, for example, triggered by an operation by the user to select a button for executing the email sending function (specifically, to tap the button with the digital pen 2), on a graphical user interface (so-called tool palette) having a plurality of icons for accepting inputs of various instructions to the projector 1 projected on the screen SC. In the flowchart shown in FIG. 8, the processing in the server device 4 is omitted.

In Step S1, the control unit 300 of the IF box 3 reads transmission destination information from an RFID tag (an example of a wireless tag) via the RFID reader/writer 302. The reading of the transmission destination information is carried out as the user holds an RFID card with an RFID tag incorporated over the RFID reader/writer 302. The RFID card is a card issued in advance for the user utilizing the image transmission system TS, for example, a staff identity card or a student identity card or the like. On the RFID tag, an email address, user ID and password for encryption, unique to the user carrying the RFID card, are stored as the transmission destination information. In Step S1, these pieces of information are read. The user ID included in the transmission destination information is an example of an identifier for identifying the user. Also, the password for encryption included in the transmission destination information is an example of encryption information.

Figure 9:
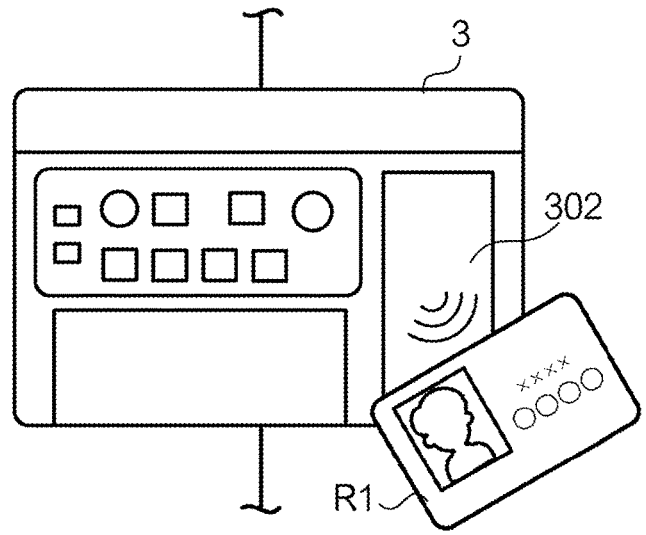
FIG. 9 shows how transmission information is read.

FIG. 9 shows how the transmission destination information is read. In the example of FIG. 9, the RFID reader/writer 302 reads the transmission destination information from an RFID card R1. If the transmission destination information is read successfully, the RFID reader/writer 302 outputs a notification sound, for example. The user confirms from this notification sound that the transmission destination information is read.

Back to FIG. 8, in Step S2, the control unit 300 transmits the transmission destination information read from the RFID tag, to the projector 1. In Step S3, the control unit 300 stores the transmission destination information received from the IF box 3 into the RAM 102. In Step S4, the CPU 100 of the projector 1 updates the setting screen I1. Specifically, the CPU 100 reflects the email address included in the transmission destination information stored in the RAM 102, into the email address input space on the setting screen I1. The CPU 100 also reflects the password included in the transmission destination information stored in the RAM 102, into the encryption input space on the setting screen I1.

Figure 10:
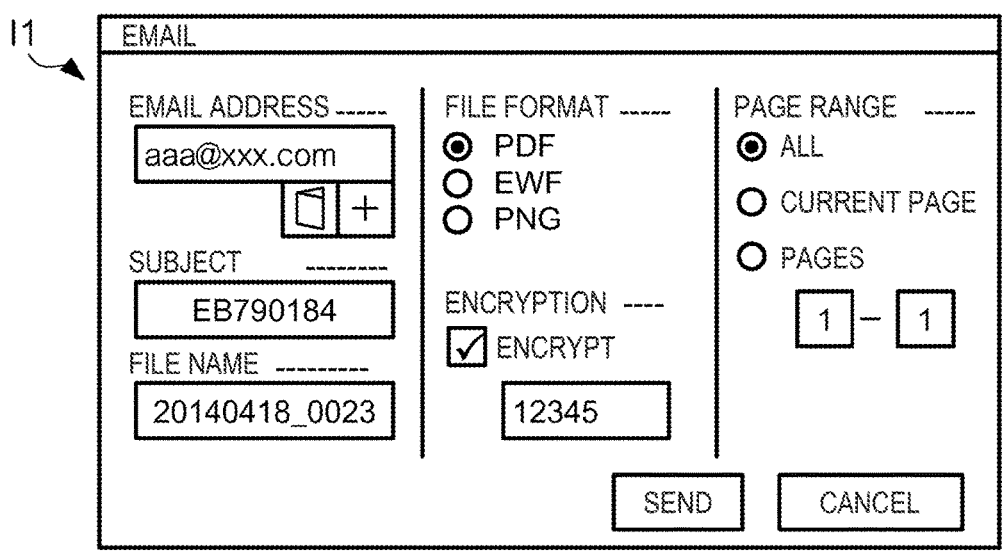
FIG. 10 shows an example of the setting screen after update.

FIG. 10 shows an example of the setting screen I1 after the update in Step S4. In this example, "aaa@xxx.com" is displayed in the email address input space and the password "12345" is displayed in the encryption space. In order to maintain the confidentiality of the password, the letter string in the encryption space may be replaced with another letter string when displayed. The user views the updated setting screen I1 and thus confirms that the email address and the password for encryption are inputted in the projector 1.

Back to FIG. 8, in Step S5, the CPU 100 determines whether the send button B1 is pressed (tapped) or not. If it is determined that the send button B1 is pressed (S5: YES), the CPU 100 shifts its processing to Step S6. If it is determined that the send button B1 is not pressed (S5: NO), the CPU 100 causes its processing to wait until the send button B1 is pressed.

In Step S6, the CPU 100 generates a hand-drawn image file (hereinafter referred to as "drawing file"). Specifically, the CPU 100 generates a drawing file of the hand-drawn image stored in the storage unit 103, in the format designated on the setting screen I1 (page range, file format, and file name designated on the setting screen I1). The CPU 100 stores the generated drawing file in the RAM 102. In Step S7, the CPU 100 encrypts the drawing file. Specifically, the CPU 100 reads out the drawing file and the password included in the transmission destination information from the RAM 102 and encrypts the drawing file with a predetermined encryption algorithm using this password.

In Step S8, the CPU 100 sends the email with the encrypted drawing file attached, to the terminal device 5.

Specifically, the CPU 100 sends the email with the drawing file attached, with the subject designated on the setting screen I1 and addressed to the designated email address. In FIG. 8, since the processing in the server device 4 is omitted, the projector 1 sends the email directly to the terminal device 5. However, in practice, the projector 1 sends the email to the server device 4, and the server device 4 sends this email to the terminal device 5.

In Step S9, the CPU 501 of the terminal device 5 accepts the input of a password. The password is inputted by the user, for example, when the user carries out an operation to open the email sent from the projector 1 and to open the drawing file attached to the email. The password inputted in Step S9 is the same as the password used to encrypt the drawing file in Step S7 (that is, the password recorded on the RFID card held over the RFID reader/writer 302 in Step S1). The user inputs the password, for example, by operating the keyboard of the terminal device 5. If the terminal device 5 has an RFID reader/writer, the user may input the password by holding the RFID card over this RFID reader/writer.

In Step S10, the CPU 501 decrypts the drawing file with a predetermined decryption algorithm using the inputted password. If the password inputted in Step S9 is different from the password used to encrypt the drawing file, the drawing file cannot be decrypted correctly. In Step S11, the CPU 501 displays the decrypted drawing file on the display unit 506.

By the above processing, when using the email sending function, the user can input the email address and the password for encryption to the projector 1 by holding the RFID card over the RFID reader/writer 302. Thus, the time and effort for the user to input the email address and the password for encryption letter by letter are eliminated and convenience at the time of using the email sending function is improved. Also, in the embodiment, the transmission destination information read from the RFID card is stored in the RAM 102, which is a volatile storage device. Thus, since the transmission destination information is lost every time the power of the projector 1 is turned off, the security of the transmission destination information is improved, compared with the case where the transmission destination information is registered in the projector 1 in advance. Moreover, in the embodiment, since the drawing file is encrypted and decrypted using the password recorded on the RFID card, even if the email is sent to an email address that is not intended by the user because of an operation error on the setting screen I1, the third party receiving this email is prevented from opening and viewing the drawing file.

4. Modifications

The invention is not limited to the above embodiment and can be carried out in various modifications. Some of such modifications will be described below. Of the modifications below, two or more may be combined.

In some cases, the whiteboard function installed in the projector 1 may include the function of drawing a specific image such as circle and rectangle, or pasting existing electric file in JPEG or BMP format in response to an indication with the digital pen 2. In the embodiment, the image attached to and transmitted with the email is described as being a "hand-drawn image". However, the image to be attached and transmitted is not limited to a hand-drawn image and may be an image in which a predetermined figure is drawn or an image in which an existing image file is pasted. Each image may be a single image or a combination of individual images. These are equivalent to an image including a figure drawn according to the position of the indicator.

The projector 1 may also be equipped with the function of superimposing a hand-drawn figure with the digital pen 2 or a predetermined figure onto a projected image (equivalent to a first image) represented by a video signal inputted from a video source, in addition to the whiteboard function. In such a case, the projector 1 may attach an image (equivalent to a second image) in which the hand-drawn figure or the predetermined figure is superimposed on the projected image, to an email and send the email with the attached image. These images are equivalent to an image including a figure drawn according to the position of the indicator.

The information included in the transmission destination information acquired by the projector 1 via the IF box 3 is not limited to the information described in the embodiment. For example, the email address need not necessarily be read from the RFID card. The projector 1 may specify the email address via the user ID included in the transmission destination information received from the IF box 3. Specifically, the projector 1 may transmit the user ID included in the transmission destination information received from the IF box 3, to an information processing device which manages email addresses (for example, the server device 4), and may receive the email address corresponding to the transmitted user ID from the information processing device. In this case, the projector 1 sends the email with the drawing file attached, addressed to the specified email address.

The RFID card from which the transmission destination information is read in Step S1 is not limited to one card. For example, in the case where the image transmission system TS is used in a meeting or in a lesson at school, the transmission destination information may be read from each of the RFID cards of a plurality of people. In this case, the projector 1 sends the email with the drawing file attached, to each of the email addresses specified by the plurality pieces of transmission destination information read via the RFID reader/writer 302.

In the case where a plurality of the digital pens 2 is used in the image transmission system TS, the hand-drawn images may be stored in the storage unit 103, discriminated by each digital pen 2. That is, the identifier for identifying a digital pen 2 and the position (trajectory) of this digital pen 2 may be stored in the storage unit 103, associated with each other. In this case, the projector 1 may generate a drawing file from different hand-drawn images according to the transmission destination information recorded on the RFID card and transmit this drawing file. Specifically, the transmission destination information includes information for designating at least one image of the plurality of hand-drawn images stored in the storage unit 103, discriminated by each digital pen 2 (hereinafter referred to as "designation information"). The projector 1 may transmit a drawing file generated from the image designated by the designation information, to the terminal device 5.

As a specific circumstance where the drawing file corresponding to the designation information is transmitted, for example, the case where the image transmission system TS is used in a school classroom and where the drawing file is transmitted to each of the terminal devices used by a teacher and student. In this example, the teacher and student draw images, using different digital pens 2 from each other. On the RFID card carried by the teacher and the RFID card (for example, student identity card) carried by the student, designation information that is different from each other is recorded. On the RFID card of the teacher, for example, designation information for designating a hand-drawn image by the digital pen 2 for the teacher and a hand-drawn image by the digital pen 2 for the student is recorded. On the RFID card of the student, for example, designation information for designating a hand-drawn image by the digital pen 2 of the teacher is recoded. In this case, if the teacher holds the RFID card over the RFID reader/writer 302 and uses the email sending function, a drawing file generated from a hand-drawn image drawn by the teacher and a hand-drawn image drawn by the student is transmitted to the terminal device used by the teacher. Meanwhile, if the student holds the RFID card over the RFID reader/writer 302 and uses the email sending function, a drawing file generated from a hand-drawn image drawn by the teacher is transmitted to the terminal device used by the student.

The user's action of holding the RFID card over the RFID reader/writer 302 is not limited to when the email sending function is used. For example, in the case where the image transmission system TS is used in a meeting or in a lesson at school, the reading of RFID cards may be carried out in order to manage attendance at and absence from the meeting or lesson. Specifically, as each user attending the meeting or lesson holds his or her own RFID card over the RFID reader/writer 302, the projector 1 creates a list of participants, using the user ID included in the transmission destination information thus read. The projector 1 then transmits the list of participants, addressed to a preset email address (here, the email address of the manager who manages attendance and absence). In another example, in the case where the projector 1 provides a function that enables the user to customize various settings related to projection, such as color mode, brightness, contrast, and sharpness, the RFID card may be read in order for the user to customize the settings and use the projector 1 with the customized settings. In this example, the user holds his or her own RFID card over the RFID reader/writer 302 when customizing the settings. The projector 1 stores, in the storage unit 103, the user ID included in the transmission destination information thus read, and information indicating the content of customization (hereinafter referred to as "customization information"), in association with each other. Also, the user holds his or her own RFID card over the RFID reader/writer 302 when using the projector 1 with the customized settings. The projector 1 reads out, from the storage unit 103, the customization information associated with the user ID included in the transmission destination information that is read, and projects an input image with the customized settings.

The RFID reader/writer for reading the transmission destination information need not necessarily be provided inside the IF box 3. The RFID reader/writer may be provided, for example, as a separate device from the IF box 3 and may be connected to the projector 1. Also, if the projector 1 is arranged in a place that the user can reach, the RFID reader/writer may be incorporated in the projector 1.

The timing when the user holds the RFID card over the RFID reader/writer 302 is not limited to the timing described in the embodiment. For example, the RFID card may be held over the RFID reader/writer 302 and the transmission destination information may be read, before the button to execute the email sending function is pressed.

The projector 1 need not necessarily encrypt the drawing file. The projector 1 may lock the drawing file, using the password included in the transmission destination information, and may transmit the locked drawing file to the terminal device 5. In this case, the drawing file is unlocked by the user inputting the password in Step S9.

The user using the email sending function may hold an electronic apparatus having a built-in RFID tag, instead of the RFID card, over the RFID reader/writer 302.

The hardware of the projector 1 for implementing the functions of FIG. 2 is not limited to the example shown in FIG. 3. For example, the projector 1 need not have the image pickup unit 107. In this case, the digital pen 2 may detect its own position and may notify the projector of the detected position. Also, the projection unit 106 need not have the light modulators for the respective color components and may have a single light modulator. Alternatively, an electro-optical element such as digital mirror device (DMD), other than the liquid crystal panel, may be used as the light modulator. Moreover, the hardware configuration of each device used in the image transmission system TS other than the projector 1 is not limited to the examples shown in FIGS. 4 to 6.

What is claimed is:

1. A projector comprising:
   a projection unit which projects a first image onto a projection surface;
   at least one processor which detects a position of an indicator on the projection surface;
   a first storage unit which stores a plurality of second images including figures drawn according to the position of the indicator; and
   a communication interface that
      acquires information including designation information for designating at least one second image of the plurality of second images and destination information for specifying a transmission destination of the second image via a wireless reader/writer;
      communicates via a network; and
      transmits the at least one second image, designated by the designation information, of the plurality of second images stored by the first storage unit to the transmission destination specified by the destination information acquired by the acquisition unit,
   wherein the transmission destination for the at least one second image is at least one email address.

2. The projector according to claim 1, wherein the at least one second image is an image made up of a figure drawn according to the position of the indicator combined with the first image.

3. The projector according to claim 1, wherein the destination information acquired by the communication interface includes information for specifying the at least one email address, and
   the communication interface transmits the at least one second image addressed to the at least one email address.

4. The projector according to claim 1, wherein the information acquired by the communication interface includes an identifier for identifying a user, and
   the communication interface transmits the at least one second image addressed to an email address specified via the identifier.

5. The projector according to claim 1, wherein the information acquired by the communication interface includes encryption information for encrypting the at least one second image, and
   the communication interface transmits the at least one second image encrypted using the encryption information.

6. The projector according to claim 1, further comprising a second storage unit which stores the information acquired by the communication interface in a volatile storage area, wherein the communication interface transmits the at least one second image to a transmission destination specified by the destination information stored by the second storage unit.

7. The projector according to claim 1, wherein the communication interface
   acquires a plurality of pieces of destination information read from a plurality of wireless tags via the wireless reader/writer, and
   transmits the at least one second image to each transmission destination of a plurality of transmission destinations specified by the plurality of pieces of destination information acquired by the communication interface.

8. The projector according to claim 1, comprising the wireless reader/writer.

9. The projector according to claim 1, wherein the communication interface acquires the information via the wireless reader/writer provided in an external device which outputs a video signal to the projector.

10. The projector according to claim 1,
    wherein
    the at least one processor detects a first position of a first indicator on the projection surface and a second position of a second indicator on the projection surface,
    the first storage unit stores the at least one second image including a first figure drawn according to the first position of the first indicator and a third image including a second figure drawn according to the second position of the second indicator, and
    the information acquired by the communication interface includes designation information for specifying at least one of the at least one second image and the third image to be transmitted to the transmission destination specified by the destination information acquired by the communication interface.

11. The projector according to claim 1, wherein
    the at least one processor detects positions of a plurality of indicators on the projection surface;
    the first storage unit stores the plurality of second images such that each of the plurality of second images is associated with one of the plurality of indicators and the plurality of second images are stored in a manner in which the plurality of second images are discriminated by indicator; and
    one or more second images, of the plurality of second images, associated with one or more indicators, of the plurality of indicators, are sent to a different transmission destination than other second images associated with other indicators.

12. A control method for a projector connected to a network, the method comprising:
    projecting a first image onto a projection surface;
    detecting a position of an indicator on the projection surface;
    storing a plurality of second images including figures drawn according to the position of the indicator;
    acquiring information including designation information for designating at least one second image of the plurality of second images and destination information for specifying a transmission destination of the at least one second image via a wireless reader/writer; and
    transmitting the at least one second image, designated by the designation information, of the plurality of second images via the network to the transmission destination specified by the destination information,
    wherein the transmission destination for the at least one second image is at least one email address.

* * * * *